March 6, 1934.    P. B. BROWN ET AL    1,949,778
VAPORIZER
Filed Dec. 7, 1932
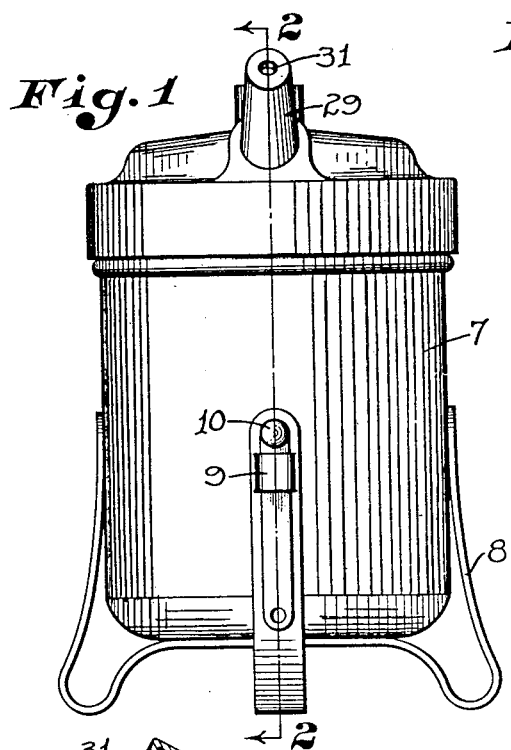
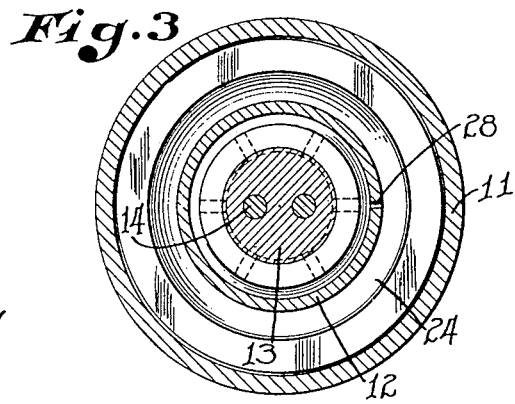
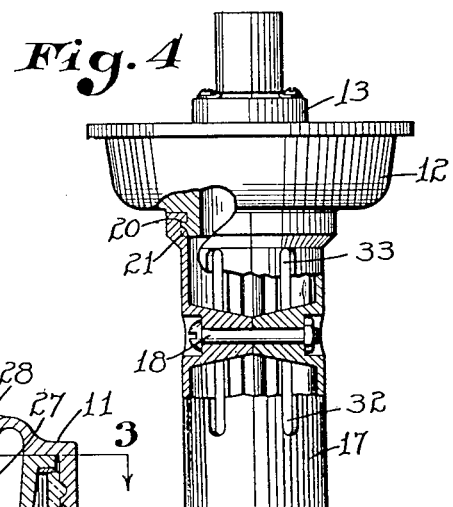
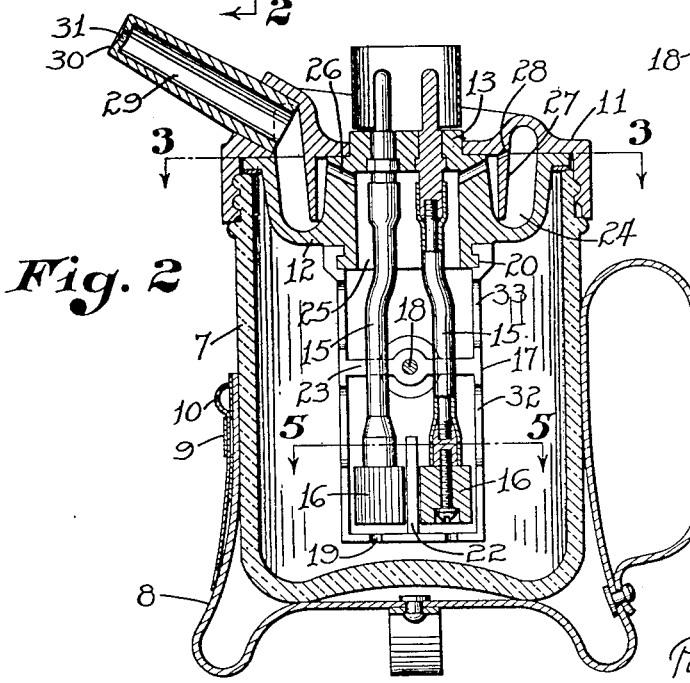
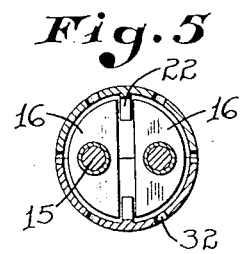
Inventors
Paul B. Brown,
Joy B. Schmitt,
By Owen & Owen,
Attorneys Patented Mar. 6, 1934

1,949,778

UNITED STATES PATENT OFFICE 1,949,778

VAPORIZER

Paul B. Brown and Joy B. Schmitt, Toledo, Ohio, assignors to The De Vilbiss Company, Toledo, Ohio, a corporation of Ohio Application December 7, 1932, Serial No. 646,075

12 Claims. (Cl. 219—40)

This invention relates to a vaporizer adapted to generate steam for humidifying the atmosphere or for vaporizing certain preparations for fumigating or for treating the nasal passages and respiratory organs.

The general object of the invention is to provide a vaporizer which may be operated safely, efficiently and economically by connection with any commercial electric light line. In its preferred form, steam is produced from water in which the electrodes are immersed and this steam, as it is passed through a fumigant or medicinal preparation, progressively vaporizes the same and carries it to a point of utilization. As the water is progressively converted into steam, the water level falls until, unless the water is replenished, the electrodes are bared and the flow of current automatically ceases.

The invention, in its preferred form, also embodies various other features, the nature and purpose of which will be more particularly explained in connection with the accompanying drawing, in which Fig. 1 is a front elevation of the vaporizer;

Fig. 2 is a section taken on the line 2—2 of Fig. 1;

Fig. 3 is a section taken on the line 3—3 of Fig. 2;

Fig. 4 is a view partly in section and partly in elevation of the electrode support and shield;

Fig. 5 is a section taken on the line 5—5 of Fig. 2.

In carrying out the invention, the water is placed in a suitable container 7, preferably of glass, which is mounted in a suitable stand 8. One side of the stand is formed with a pocket or sheath 9 for receiving a small measuring spoon 10, to be used for measuring out a small quantity of salt to be dissolved in the water to insure the proper conductivity.

The cover to the container 7 is preferably made from bakelite or similar nonconductive material and is composed of an outer section 11 and an inner section 12 which is secured between the outer section and the top of the container 7. The inner section 12 projects upwardly at the center through the upper section 11 as shown at 13, and electric terminals 14 are secured therein. Conductors 15, preferably encased in rubber, extend downwardly from the terminals 14 and are provided at their lower ends with carbon electrodes 16 adapted to be immersed in the liquid in the container 7.

The electrodes 16 are positively held in predetermined position and are protected by a substantially cylindrical shield 17 which is made up of two equal sections secured together by a machine bolt 18 or the like. The shield 17 is provided with suitable openings 19 so that the liquid within the container 7 will have free access to the electrodes. The central downwardly extending portion of the cover section 12 and the upper end of the shield 17 are provided with a cooperating circular flange and channel 20 so that the sections of the shield 17 are clamped to the cover section at the same time that they are secured to each other by the bolt 18. The flange and channel 20 are provided at one or more points with a cooperating notch and lug 21 to positively fix the position of the shield 17 circumferentially with reference to the electrode support. The interior of the shield 17 is also provided with spacing webs 22 and 23 which positively fix the position of the electrode when the shield is secured in position.

The lower section 12 of the cover is formed with an annular trough 24 for receiving medicament or fumigant. The section 12 is also formed with a central cavity 25 from which ports 26 open into the inside of the trough 24 near the top thereof. The spacing web 23 also constitutes a baffle, so that the steam or vapor generated within the shield 17 will be diverted outwardly through the slots 32 in the shield and thence inwardly through the upper slots 33 to the cavity 25. This effectually prevents any drops of unvaporized water from being carried over into the medicament.

The upper section 11 of the cover is formed with a downwardly extending annular flange 27 which extends nearly to the bottom of the trough 24. The steam or vapor, as it rises from the liquid in the container 7, passes through the ports 26 and downwardly beneath the flange 27 and bubbles through whatever preparation has been placed in the trough 24. In doing so, it forces the level of the medicament inside the flange 27 down to the lower edge of the flange. This flange is appreciably closer to the inner wall of the trough 24 than it is to the outer wall, so that the rise in the level of the medicament outside of the flange is less than the drop in the level inside of the flange. A small bleed hole 28 is also provided near the base of the flange 27 to relieve any back pressure which might be created by reason of the vacuum formed in the container when the liquid is allowed to cool.

The trough 24 is provided with an outlet spout 29 which is comparatively large and which terminates in an abrupt end 30 with a central orifice 31. Thus the vapor passes freely from the trough 24 into the spout, but its emission through the orifice 31 is restricted. Any particles of liquid which might otherwise be condensed and thrown from the spout will be caught and will drain back into the trough 24.

This vaporizer is easily and economically operated. It is efficient, safe, durable, rust-proof and sanitary. It is safe to sleep while the vaporizer is in operation, since the current will be automatically shut off when the water has been evaporated. It will also be noted that medicament or fumigant placed in the trough 24 does not come in contact with the electrodes. Thus the fouling of the electrodes and the jar or container is prevented.

While we have shown and described in detail the preferred form of the invention, it will be apparent that the same may be considerably modified without departing from the scope of the appended claims.

What we claim is:—

1. In a vaporizer, the combination with a cover and means for removably securing same to a liquid receptacle, of two electrodes in depending relation to the inside of said cover and having terminals outside the cover for connection to an electric service line, a shield in protective relation to said electrodes and having an outlet in its upper end to emit vapor generated by the heat from the electric current passing between the electrodes when the latter are immersed in the liquid, and a baffle within the shield between its upper and lower ends, the side of said shield being provided with openings to permit vapor to pass from the vicinity of the electrodes outwardly through the wall of the shield and thence back into the shield above the baffle.

2. In a vaporizer, the combination with a cover and means for removably securing same to a liquid receptacle, of two electrodes in depending relation to the inside of said cover and having terminals outside the cover for connection to an electric service line, a shield in protective relation to said electrodes and having openings to admit the liquid to contact with said electrodes when the cover is secured to the receptacle, a compartment beneath the cover for containing medicament, and means for discharging vapor from the top of the shield into said compartment below the normal level of the medicament.

3. In a vaporizer, the combination with a cover and means for removably securing same to a liquid receptacle, of two electrodes in depending relation to the inside of said cover and having terminals outside the cover for connection to an electric service line, a shield in protective relation to said electrodes and having openings to admit the liquid to contact with said electrodes when the cover is secured to the receptacle, an annular compartment adjacent the upper part of the shield and having an outlet to the atmosphere, and means for discharging vapor from the top of the shield into the bottom portion of said compartment.

4. In a vaporizer, the combination with a cover and means for removably securing same to a liquid receptacle, of two electrodes in depending relation to the inside of said cover and having terminals outside the cover for connection to an electric service line, a shield in protective relation to said electrodes and having openings to admit the liquid to contact with said electrodes when the cover is secured to the receptacle, an annular compartment adjacent the upper part of the shield and adapted to contain medicament, an annular partition extending from the top of said compartment downwardly below the normal level of the medicament and closer to the inner wall than to the outer wall of the compartment, and means to direct vapor from the top of the shield into the inner portion of said compartment, the outer portion of said compartment having an outlet to the atmosphere.

5. In a vaporizer, the combination with a cover and means for removably securing same to a liquid receptacle, of two electrodes in depending relation to the inside of said cover and having terminals outside the cover for connection to an electric service line, a shield in protective relation to said electrodes and having openings to admit the liquid to contact with said electrodes when the cover is secured to the receptacle, an annular compartment adjacent the upper part of the shield and adapted to contain medicament, an annular partition extending from the top of said compartment downwardly below the normal level of the medicament and closer to the inner wall than to the outer wall of the compartment, means to direct vapor from the top of the shield into the inner portion of said compartment, and a comparatively large outlet spout leading from the outer portion of said compartment and terminating in an abrupt end with a central restrictive orifice therein.

6. In a vaporizer, a pair of electrodes adapted to be connected to an electric service line a receptacle having a cover provided with means for supporting said electrodes in pendant position with their lower ends immersed, a shield for said electrodes, said shield being made up of separable sections including a horizontal partition formed with means to positively hold the electrodes in predetermined spaced relation, and cooperating means to simultaneously secure said sections to each other and to said supporting means and at the same time to secure said spacing means in operative relation to the electrodes, said shield being provided with a vapor outlet from its upper end and with openings above and below the partition, thereby providing a circuitous path for the vapor to prevent any drops of unvaporized liquid from being carried to said outlet.

7. In a vaporizer, a pair of electrodes adapted to be connected to an electric service line, means for supporting said electrodes in pendant position with their lower ends immersed, said supporting means being formed with a circular flange, a shield for said electrodes made up of separable sections collectively formed with a channel to receive said flange, and means for simultaneously securing said sections to each other and to said flange.

8. In a vaporizer, a pair of electrodes adapted to be connected to an electric service line, means for supporting said electrodes in pendant position with their lower ends immersed, said supporting means being formed with a circular flange, a substantially cylindrical shield for said electrodes made up of separable sections collectively formed with a channel to receive said flange, and means within the shield to determine the position of the electrodes, said flange and channel having co-engaging means to determine the position of the shield circumferentially.

9. In a vaporizer, the combination with a cover and means for removably securing the same to a liquid receptacle, of an annular compartment beneath the cover adapted to contain medicament, an annular partition extending from the top of said compartment downwardly below the normal level of the medicament and closer to the inner wall than to the outer wall of the compartment, and means to vaporize liquid and direct the same over the inner wall and into the inner portion of said compartment, the outer portion of said compartment having an outlet to the atmosphere.

10. In a vaporizer, the combination with a cover and means for removably securing the same to a liquid receptacle, of an annular compartment beneath the cover adapted to contain medicament, an annular partition extending from the top of said compartment downwardly below the normal level of the medicament and closer to the inner wall than to the outer wall of the compartment, means to vaporize liquid and to direct the vapor over the inner wall and into the inner portion of said compartment, and a comparatively large outlet spout leading from the outer portion of said compartment and terminating in an abrupt end with a central restrictive orifice therein.

11. In a vaporizer, the combination with a liquid receptacle, a cover and means for removably securing the cover to said receptacle, of a separate compartment within the upper part of the receptacle beneath the cover, means to vaporize liquid in the bottom of the receptacle and to pass the vapor under pressure through said compartment, and a comparatively large outlet spout leading from said compartment and terminating in an abrupt end with a central restrictive orifice therein.

12. In a vaporizer, the combination with a cover and means for securing the same to a liquid receptacle, of an annular compartment beneath the cover adapted to contain medicament, an annular partition extending from the top of said compartment downwardly below the normal level of the medicament, and means to vaporize liquid and discharge the same over a side wall of said compartment and thence beneath the partition to the opposite side thereof, said compartment having an outlet to the atmosphere on said opposite side of the partition.

PAUL B. BROWN.
JOY B. SCHMITT.